May 23, 1967
R. L. BANKS
3,321,547
CONVERSION OF PROPANE TO DIISOPROPYL
Filed Nov. 23, 1964
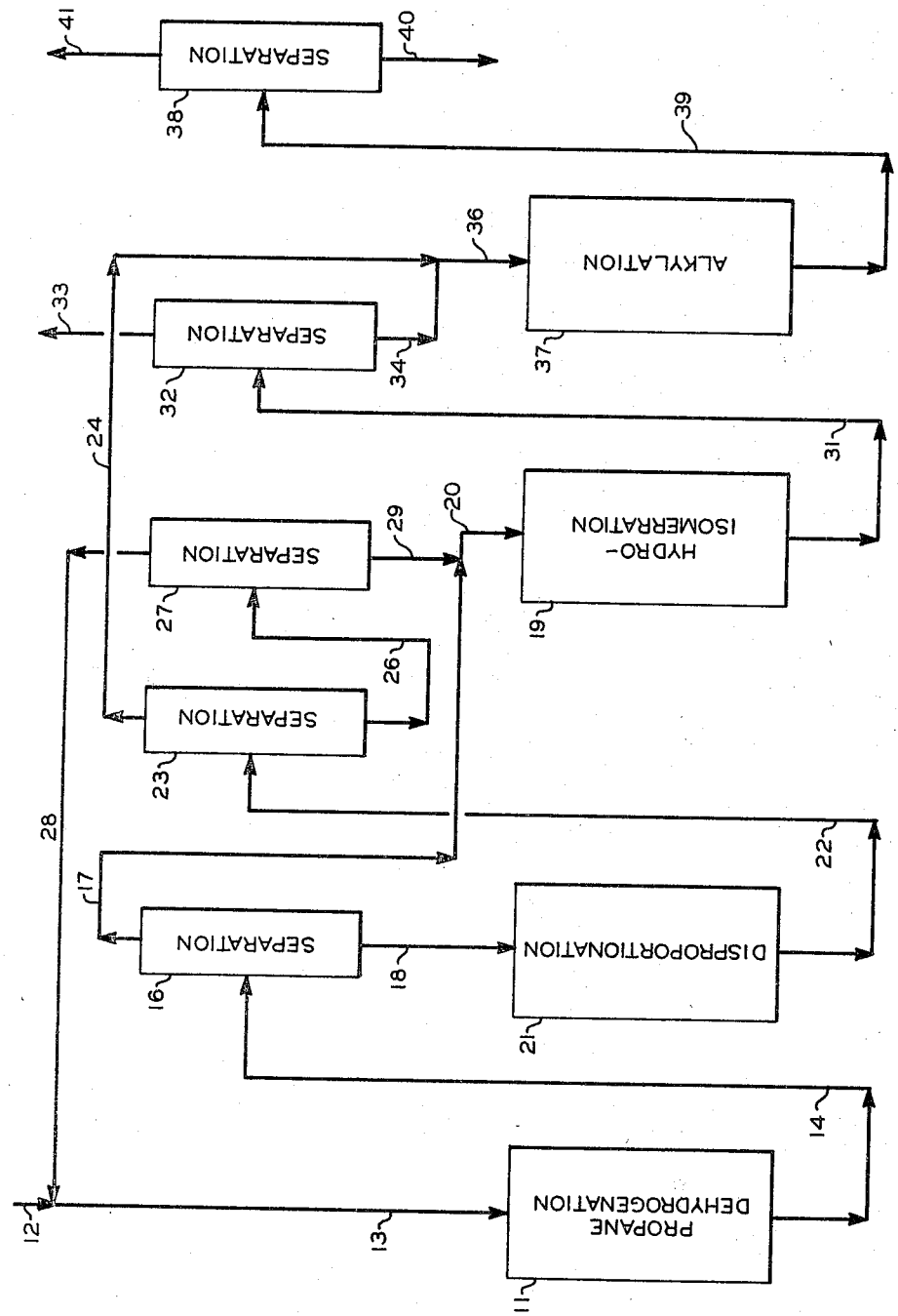
INVENTOR.
R. L. BANKS
BY
*Young & Quigg*
ATTORNEYS

United States Patent Office 3,321,547
Patented May 23, 1967

---

3,321,547
CONVERSION OF PROPANE TO DIISOPROPYL
Robert L. Banks, Bartlesville, Okla., assignor to Phillips Petroleum Company, a corporation of Delaware
Filed Nov. 23, 1964, Ser. No. 412,928
2 Claims. (Cl. 260—683.47)

This invention relates to hydrocarbon conversion. In one aspect, the invention relates to the production of diisopropyl from propane.

In many instances, there is an oversupply of propane. It is advantageous to convert such propane to a product which is in short supply and which demands a higher price. One difficulty with many hydrocarbon conversion processes is that an appreciable amount of less valuable by-products are produced, often including some for which there is little demand. I have found that diisopropyl can be produced from a single, simple, widely available feed, propane, with only a small proportion of by-products.

An object of my invention is to produce a more valuable hydrocarbon from a less valuable hydrocarbon.

Another object of my invention is to convert propane to diisopropyl.

Other aspects, objects and the advantages of my invention are apparent in the written description, the drawing, and the claims.

According to my invention, propane is converted to diisopropyl by cracking the propane to produce an effluent stream comprising hydrogen, ethylene and propylene, disproportionating the propylene to produce butenes and additional ethylene, hydroisomerizing the butenes to isobutane utilizing the hydrogen from the cracking step, and alkylating the isobutane utilizing the previously produced ethylene.

In general, the propane cracking step is carried out thermally or catalytically at a temperature in the range of 950–2000° F. and a pressure of 0–1000 p.s.i.g. in conventional cracking apparatus. The propylene disproportionation step is carried out at 0–1500 p.s.i.g. and 100–1200° F., depending upon the catalyst selected. Applicable catalysts are molybdenum or tungsten compounds such as oxides, carbonyls, or sulfides which are supported on silica, alumina, silica-alumina, or other suitable supports. The feed to this unit can be a mixture of propylene and propane. Operating conditions suitable for the catalyst and feed are selected.

By olefin disproportionation is meant the conversion of an olefinic hydrocarbon into olefinic hydrocarbons of both higher and lower number of carbon atoms per molecule. When propylene is disproportionated, approximately equimolar quantities of ethylene and butenes are produced.

Details of some suitable disproportionation processes are given in copending applications Ser. No. 307,371, Hecklesberg, filed Sept. 9, 1963; Ser. No. 312,209, Banks, filed Sept. 27, 1963; Ser. No. 336,624, Hecklesberg, filed Jan. 9, 1964; and Ser. No. 94,996, Banks, filed Mar. 13, 1961.

The hydroisomerization stage is operated at 0–1500 p.s.i.g. and 200–900° F. over conventional hydroisomerization catalysts such as platinum halides supported on active alumina, in the presence of hydrogen. Hydrogen is recovered from the cracking effluent and fed to this step.

The alkylation of the isobutane from the hydroisomerization step with ethylene to produce diisopropyl is carried out in any suitable manner. For example, aluminum chloride-containing catalysts can be used at 50–200° F. and pressures sufficient to maintain liquid phase. The ethylene can be contacted with isobutane in the presence of an aluminum chloride hydrocarbon complex with the isobutane being supplied from the hydroisomerization step and the ethylene from the disproportionation effluent and the cracking effluent. The isobutene-ethylene ratio is in the range of about 3:1 to 10:1. The diisopropyl is separated by conventional separation means and recovered for use as a high quality fuel alkylate.

In the drawing, propane is fed to cracking (dehydrogenation) unit 11 through pipes 12 and 13 and the effluent, comprising propane, propylene, ethylene, methane and hydrogen is passed through pipe 14 and separated in fractional distillation column 16, hydrogen, methane, and ethylene being taken overhead through pipe 17 and propylene and propane as a bottoms product through pipe 18. The overhead stream comprising hydrogen and ethylene is fed into hydroisomerization unit 19. The combined propylene-propane stream from column 16 is fed into disproportionation unit 21 and the effluent stream, comprising ethylene, propylene, propane and butenes, is fed through pipe 22 to fractional distillation column 23. Ethylene is removed overhead through pipe 24 and the remainder taken from the bottom through pipe 26 to fractional distillation column 27. The propane and propylene are taken overhead through pipe 28 and recycled to cracking unit 11 while the butenes are taken as a bottoms product through pipe 29 to hydroisomerization unit 19 along with the hydrogen which is taken overhead from column 16, the combined stream being fed through pipe 20. The effluent, comprising isobutane, is fed through pipe 31 to fractional distillation unit 32. Hydrogen, methane, ethane and propane are taken overhead through pipe 33 while the bottoms product, comprising primarily isobutane, is removed through pipe 34. The streams in pipes 24 and 34 are combined and fed through pipe 36 to alkylation reactor 37. The resulting effluent from alkylation unit 37, comprising diisopropyl, is fed to separator 38 through pipe 39. Diisopropyl is recovered through pipe 40 and a small stream comprising ethylene, propylene, propane and isobutane is removed through pipe 41.

Although not shown, the combination of steps of this invention are unitized to conserve heat, materials, and equipment by use of suitably located heat exchangers, separation stages, and recycle streams. Unconverted propylene and propane are removed from the disproportionation effluent and returned to the cracking stage. Excess hydrogen can be recycled to the hydroisomerization zone, and unconverted isobutane can be returned to the alkylation stage.

Other equipment and process steps can be utilized as desired or necessary including, for example, pumps, valves, separators, heaters, coolers, catalyst separators, other separation and recycle steps, etc.

In an example according to my invention, dehydrogenation unit 11 is operated at a temperature of 1100° F. at atmospheric pressure with a chromia-alumina catalyst. Disproportionation unit 21 is operated at 800° F. and 400 p.s.i.g. with a tungsten oxide-silica catalyst. Isomerization unit 19 is operated at 250° F. at 250 p.s.i.g. with a supported aluminum chloride catalyst with hydrogen recycle. Alkylation unit 37 is operated at 130° F. and 300 p.s.i.g. with an aluminum chloride catalyst with ethylene recycle. Compositions of the various streams are given in Table I wherein the column numbers correspond with the pipe numbers in the drawing.

3,321,547

TABLE I
[Moles Per 1,000 Moles Propane Feed]

| | 12 | 28 | 13 | 14 | 17 | 18 | 22 | 24 | 26 | 29 | 20 | 31 | 33 | 34 | 36 | 16 | 41 | 40 |
|---|---|---|---|---|---|---|---|---|---|---|---|---|---|---|---|---|---|---|
| Hydrogen | | | | 930 | 930 | | | | | | 930 | 480 | 480 | | | | | |
| Methane | | | | 55 | 55 | | | | | | 55 | 55 | 55 | | | | | |
| Ethylene | | 4 | 4 | 40 | 39 | 1 | 425 | 420 | 5 | 1 | 40 | 1 | 1 | | 420 | 20 | 20 | |
| Ethane | 2 | | | 21 | 20 | 1 | 1 | 1 | | | 20 | 59 | 59 | | 1 | 1 | 1 | |
| Propylene | 38 | 980 | 1,018 | 1,893 | 18 | 1,875 | 1,005 | 950 | 15 | 10 | 28 | 1 | 1 | | 15 | 5 | 5 | |
| Propane | 1,000 | 930 | 1,930 | 960 | 10 | 950 | 990 | 10 | 940 | | 5 | 4 | 4 | | 17 | 17 | 17 | 5 |
| Isobutane | 4 | 1 | 5 | 5 | | 5 | 5 | | 5 | 4 | 4 | 390 | | 385 | 385 | 25 | 20 | |
| n-Butane | 4 | 1 | 5 | 5 | | 5 | 5 | | 5 | 4 | 4 | 16 | | 16 | 16 | 2 | 2 | |
| Isobutene | | | | | | | | | | | | 2 | | 2 | 2 | | | |
| n-Butenes | | 1 | 1 | 1 | | 1 | 418 | 416 | 414 | 414 | 414 | 10 | | 10 | 10 | 2 | 2 | |
| C$_5$+ | | 2 | 2 | 2 | | 2 | 15 | | 15 | 15 | 15 | 15 | | 15 | 15 | 425 | 5 | [1] 420 |

[1] Pentanes, 10 moles; Diisopropyl, 280 moles; Other Hexanes, 20 moles; Heptanes, 50 moles; Octanes, 50 moles; Heavier, 10 moles. Total 420 moles.

Reasonable variation and modification are possible within the scope of my invention which sets forth a process for producing diisopropyl from propane.

I claim:

1. A process for producing diisopropyl, comprising the steps of:
   cracking propane in a cracking zone to produce hydrogen, ethylene and propylene;
   separating the effluent of the propane cracking to produce a first stream comprising substantially all of said propylene and unconverted propane and a second stream comprising substantially all of said hydrogen and said ethylene;
   passing said first stream into a disproportionation zone and disproportionating propylene therein to produce butene and additional ethylene;
   separating the effluent from the disproportionation to produce a third stream comprising unconverted propane and propylene and substantially all of said butene and a fourth stream comprising substantially all of said additional ethylene;
   separating said third stream to produce a fifth stream comprising substantially all of said butene and a sixth stream comprising substantially all of said unconverted propane and propylene;
   passing said second and fifth streams into a hydroisomerization zone and hydroisomerizing butenes therein, utilizing hydrogen produced by cracking said propane, to produce isobutane;
   separating the effluent of said hydroisomerization zone to produce a seventh stream comprising substantially all of said isobutane and an eighth stream comprising unconverted hydrogen;
   passing said fourth stream and said seventh stream into an alkylation zone and alkylating isobutane therein utilizing said additional ethylene, thereby producing diisopropyl; and
   returning said sixth stream to said cracking zone.

2. A process for producing diisopropyl, comprising the steps of:
   feeding a stream comprising propane into a cracking zone and maintaining conditions in said cracking zone suitable for cracking propane suitable for producing hydrogen, ethylene and propylene, said conditions including a temperature in the range of 950–2000° F. and a pressure in the range of 0–1000 p.s.i.g.;
   separating the effluent from said cracking zone to produce a first stream comprising substantially all of said propylene and unconverted propane and a second stream comprising substantially all of said hydrogen and said ethylene;
   passing said first stream into a disproportionation zone in contact with a propylene disproportionation catalyst and maintaining conditions suitable for converting propylene to butene and additional ethylene, said conditions being selected in appropriate ranges suitable for the catalysts selected, said conditions including a temperature in the range of 100–1200° F. and a pressure in the range of 0–1500 p.s.i.g.;
   separating the effluent of said disproportionation zone into a third stream comprising unconverted propane and propylene and substantialy all of said butene and a fourth stream comprising substantially all of said additional ethylene;
   separating said third stream into a fifth stream comprising substantially all of said butene and a sixth stream comprising substantially all of said unconverted propane and propylene;
   passing said second stream and said fifth stream into a hydroisomerization zone in contact with a hydroisomerization catalyst under conditions suitable for converting butane to isobutane utilizing said hydrogen produced by cracking, said conditions including a temperature in the range of 200–900° F. and a pressure in the range of 0–1500 p.s.i.g.;
   separating the effluent of said hydroisomerization zone to produce a seventh stream comprising substantially all of said isobutane and an eighth stream comprising unconverted hydrogen;
   passing said fourth stream and said seventh stream into an alkylation zone in contact with an alkylation catalyst under conditions suitable for producing diisopropyl utilizing said additional ethylene, under conditions suitable for producing diisopropyl, said conditions including a temperature in the range of 50–200° F. and a pressure sufficient to maintain liquid phase; and
   returning said sixth stream to said cracking zone.

References Cited by the Examiner

UNITED STATES PATENTS

| | | | |
|---|---|---|---|
| 2,557,114 | 6/1951 | Kennedy et al. | 260—683.47 |
| 2,866,790 | 12/1958 | Pitzer | 260—669 |
| 3,182,097 | 5/1965 | Brennan et al. | 260—683.65 |
| 3,261,879 | 7/1966 | Banks | 260—683 |

DELBERT E. GANTZ, *Primary Examiner.*

R. H. SHUBERT, *Examiner.*